(12) United States Patent
Suzuki

(10) Patent No.: US 7,954,860 B2
(45) Date of Patent: Jun. 7, 2011

(54) COUPLING MECHANISM

(76) Inventor: Hideo Suzuki, Tokyo (JP)

( * ) Notice: Subject to any disclaimer, the term of this patent is extended or adjusted under 35 U.S.C. 154(b) by 303 days.

(21) Appl. No.: 12/309,685

(22) PCT Filed: Feb. 5, 2007

(86) PCT No.: PCT/JP2007/052430
§ 371 (c)(1),
(2), (4) Date: Jan. 27, 2009

(87) PCT Pub. No.: WO2007/116606
PCT Pub. Date: Oct. 18, 2007

(65) Prior Publication Data
US 2010/0001515 A1 Jan. 7, 2010

(30) Foreign Application Priority Data
Mar. 31, 2006 (JP) .................... 2006-096202

(51) Int. Cl.
*F16L 17/00* (2006.01)
(52) U.S. Cl. .......... 285/374; 285/337; 285/113; 285/81; 285/321
(58) Field of Classification Search .................. 285/95, 285/104, 108, 113, 81, 400, 403, 332.2, 374, 285/321, 342, 399, 337, 332.1
See application file for complete search history.

(56) References Cited

U.S. PATENT DOCUMENTS

| 472,342 A | * | 4/1892 | Draudt | 285/317 |
|---|---|---|---|---|
| 611,305 A | * | 9/1898 | Westcott | 285/81 |
| 1,622,216 A | * | 3/1927 | Herman et al. | 285/88 |
| 2,952,480 A | * | 9/1960 | Gabriel et al. | 285/18 |
| 3,144,262 A | * | 8/1964 | Reynolds | 285/311 |
| 3,151,891 A | * | 10/1964 | Sanders | 285/110 |
| 3,177,019 A | * | 4/1965 | Osweiler | 285/321 |
| 3,456,963 A | * | 7/1969 | Dillon | 285/39 |
| 3,603,619 A | * | 9/1971 | Bengesser et al. | 285/45 |
| 3,815,940 A | * | 6/1974 | Luckenbill | 285/105 |

(Continued)

FOREIGN PATENT DOCUMENTS

JP 3-21372 9/1991

(Continued)

*Primary Examiner* — Aaron Dunwoody
(74) *Attorney, Agent, or Firm* — Welsh Flaxman & Gitler LLC

(57) ABSTRACT

In a coupling mechanism, an inner peripheral wall of a coupling main body is inscribed with an outer side ring groove of containing an outer peripheral side edge portion of a stopper member, a stopper member introducing port formed by a width wider than a width dimension of a strip member of the stopper member is inscribed at a position of an outer wall portion of the coupling main body slightly shifted from a position of inscribing the outer side ring groove to a side of an inserting front end, the stopper member is applied with a spiral torsion such that both end portions opposed to each other of the strip member slightly carry out core deviation, an inner peripheral wall of the outer side ring groove is formed by a taper face in a state of being expanded from a rear end side to a front end side in an inserting direction, also an outer peripheral wall of the stopper member is formed by a taper face of a shape in correspondence with the taper face of the outer side ring groove, the inner peripheral wall of the stopper member is formed by a shape substantially in parallel with an outer peripheral wall of the connected pipe, and a face of the inner peripheral wall is formed by a rough face achieving a slip preventing effect.

6 Claims, 14 Drawing Sheets

U.S. PATENT DOCUMENTS

| | | | | |
|---|---|---|---|---|
| 3,920,270 A | * | 11/1975 | Babb | 285/104 |
| 4,040,651 A | * | 8/1977 | LaBranche | 285/113 |
| 4,061,366 A | * | 12/1977 | Affa | 285/37 |
| 4,083,585 A | * | 4/1978 | Helm | 285/260 |
| 4,466,640 A | * | 8/1984 | Van Houtte | 285/104 |
| 5,490,694 A | * | 2/1996 | Shumway | 285/305 |
| 5,709,415 A | * | 1/1998 | Witter | 285/304 |
| 5,992,905 A | * | 11/1999 | Kennedy et al. | 285/337 |
| 6,062,611 A | * | 5/2000 | Percebois et al. | 285/374 |
| 6,685,238 B1 | * | 2/2004 | Pouillard | 285/337 |
| 6,893,051 B1 | * | 5/2005 | Park et al. | 285/104 |
| 6,913,293 B1 | * | 7/2005 | Filer | 285/403 |
| 7,393,019 B2 | * | 7/2008 | Taga et al. | 285/321 |
| 7,559,583 B2 | * | 7/2009 | Stoetzer | 285/403 |

FOREIGN PATENT DOCUMENTS

| | | |
|---|---|---|
| JP | 2000-28060 | 1/2000 |
| JP | 2004-239289 | 8/2004 |

* cited by examiner

COUPLING MECHANISM

BACKGROUND OF THE INVENTION

1. Field of the Invention

The present invention relates to a coupling mechanism of a pipe, further in details, relates to a coupling mechanism which is applicable even when a connected pipe is elongated or contracted to move or pivoted safely without being influenced thereby, and excellent in ensuring a sealing performance of a connected portion and inexpensive and excellent also in an execution performance.

2. Description of the Related Art

A coupling mechanism of this kind is utilized for connecting a connected pipe in various piping systems of mainly supply and drain pipes, intake and exhaust pipes, power/communication cable protecting pipes or the like in a background art.

There is a coupling mechanism of a background art of inserting a connected pipe to a coupling main body by way of a rubber ring for sealing (JP-A-10-19178).

Further, there is also known a coupling mechanism of such a constitution including detachment preventing means for preventing a connected pipe from being detached from a coupling main body (JP-A-7-139674).

Further, there is also present a coupling mechanism an application of which is filed previously by the applicant and which is easy to execute and excellent in an availability in comparison with the above-described background art (JP-A-2004-239289).

Meanwhile, according to JP-A-10-19178, means for preventing detachment of the connected pipe is not present, and therefore, there poses a problem that an accident of drawing the connected pipe from the coupling main body is liable to be brought about.

In contrast thereto, in order to prevent the accident of simply drawing the connected pipe, as in JP-A-7-139674, there is proposed the coupling mechanism including the detachment preventing means of preventing the connected pipe from being drawn, however, according to the coupling mechanism of such a constitution, there poses a problem that a constitution of the detachment preventing means is complicated, an operation of fastening (or fixing) the detachment preventing means is unconceivably troublesome, an enormous time period is required for an execution thereof. Further, although the connected pipe is solidly prevented from being detached by caulking means, in this case, an elongating or contracting movement or a pivoting movement of the connected pipe cannot be dealt with, on the other hand, in a system of connecting the connected pipe by a screwing system, there also poses a problem that when the connected pipe is thin-walled, strength guarantee is deteriorated by a reduction in a wall thickness.

As a coupling mechanism of resolving the above-described problem, there is present the invention of JP-A-2004-239289, the application of which is filed previously by the applicant. Although certainly, resolution of the above-described problem can sufficiently be dealt with by the JP-A-2004-239289, according to the coupling mechanism of JP-A-2004-239289, it is necessary to form an inner side ring groove (notation 10 in FIG. 1 and FIG. 6 of Reference 3) for containing an inner peripheral side edge portion of a stopper member at a position of an outer peripheral wall of the connected pipe inserted to inside of the coupling main body.

Although the inner side ring groove is present for ensuring connection of the coupling main body and the connected pipe by way of the stopper member, the inventor has conceived that the operation for forming the inner side ring groove is not needed by enabling not to form the inner side ring groove at the connected pipe when possible to be able to finish the invention.

The invention provides a coupling mechanism having advantages to be mentioned especially of resolving all of the above-described problems, achieving a firm sealing effect between a coupling main body and a connected pipe despite a simple constitution, capable of preventing an accident of drawing the connected pipe and capable of dealing with elongating or contracting movement or pivoting movement of the connected pipe, facilitating an execution of integrating the connected pipe and the coupling main body, with no need of preparing a special tool for the execution, capable of instantaneously determining an acceptability of a result of the execution operation by only checking the appearance of the finished coupling mechanism, and capable of dispensing with formation of the inner side ring groove of the connected pipe.

SUMMARY OF THE INVENTION

In order to achieve the above object, according to a first aspect of the invention, there is provided a coupling mechanism including a coupling main body in a shape of a circular cylinder, a stopper member in a shape of notching a portion of a ring-like strip member, a connected pipe inserted to an inner side of the coupling main body, and an elastic ring for sealing attached to an outer periphery in the vicinity of an inserting front end of the connected pipe, wherein an inner peripheral wall of the coupling main body is inscribed with an outer side ring groove containing an outer peripheral side edge portion of the stopper member, and a stopper member introducing port formed by a width wider than a width dimension of the strip member of the stopper member is inscribed at a position of an outer wall portion of the coupling main body shifted from a position of inscribing the outer side ring groove slightly on a side of an inserting front end, the stopper member is brought into a state of being applied with a spiral torsion such that both end portions opposed to each other of the strip member of the stopper member carry out a core deviation slightly, an inner peripheral wall of the outer side ring groove is formed by a taper face in a state of being expanded from a rear end side to a front end side in an inserting direction, and also an outer peripheral wall of the stopper member is formed in a taper face of a shape in correspondence with the taper face of the outer side ring groove, and the inner peripheral wall of the stopper member is formed in a state of being substantially in parallel with the outer peripheral wall of the connected pipe and a face of the inner peripheral wall is formed by a rough face achieving a slip preventing effect.

Also, according to a second aspect of the invention, in the coupling mechanism according to the first aspect, the rough face of the face of the inner peripheral wall of the stopper member is of a saw teeth shape.

Further, according to a third aspect of the invention, in the coupling mechanism according to the first or second aspect, a closing piece of closing the stopper member introducing port is formed at a portion of the coupling main body.

Further, according to a fourth aspect of the invention, in the coupling mechanism according to any one of the first to third aspects, a rise piece is formed at an edge portion of a rear end of the stopper member.

Further, according to a fifth aspect of the invention, in the coupling mechanism according to any one of the first to fourth aspects, a notched portion capable of containing the rise piece of the stopper member is formed in the vicinity of an edge portion of the stopper member introducing port.

Further, according to a sixth aspect of the invention, in the coupling mechanism according to any one of first to fifth aspects, in a positioning stepped portion capable of being brought into contact with the inserting front end of the connected pipe is formed at a face of an inner peripheral wall of the coupling main body.

DETAILED DESCRIPTION OF THE PREFERRED EMBODIMENT

A detailed description will be given of an embodiment of a coupling mechanism according to the invention with reference to attached drawings.

Figure 1:
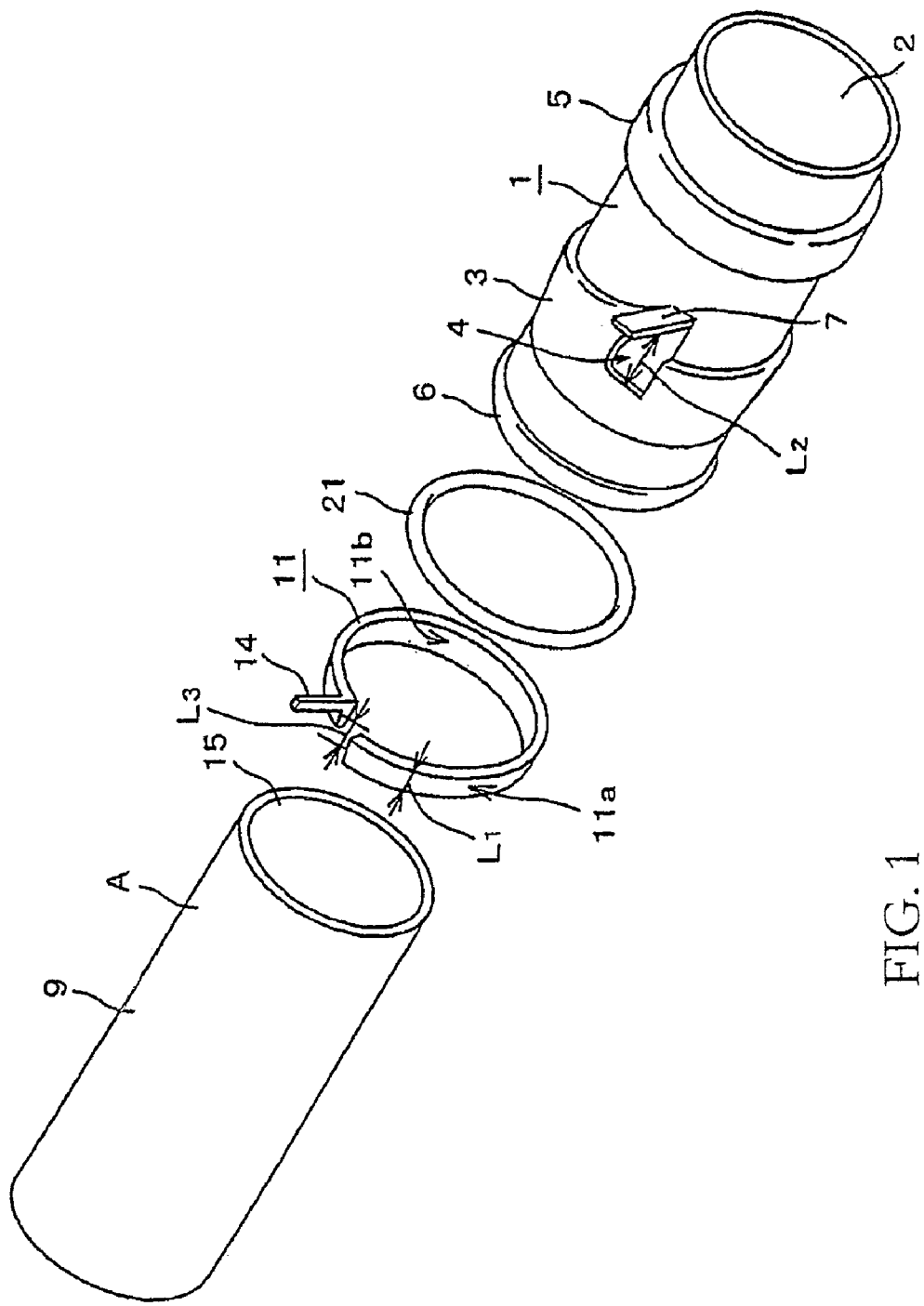
FIG. 1 is a disassembled perspective view of a coupling mechanism according to the invention.
Figure 2:
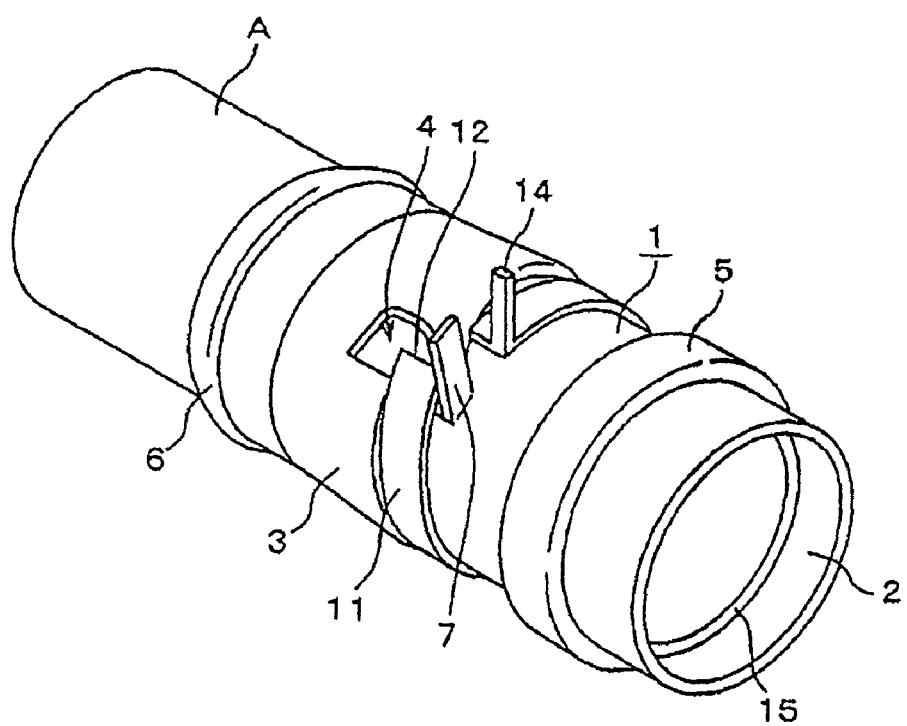
FIG. 2 is a perspective view of a state in the midst of integrating the same.
Figure 3:
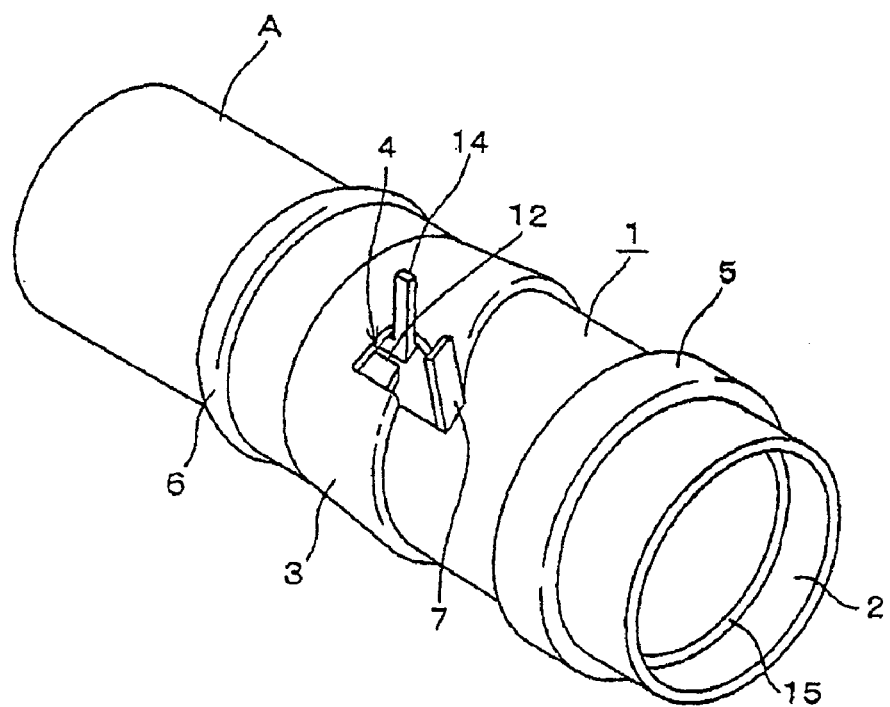
FIG. 3 is a perspective view of a state of finishing to integrate the same.
Figure 4:
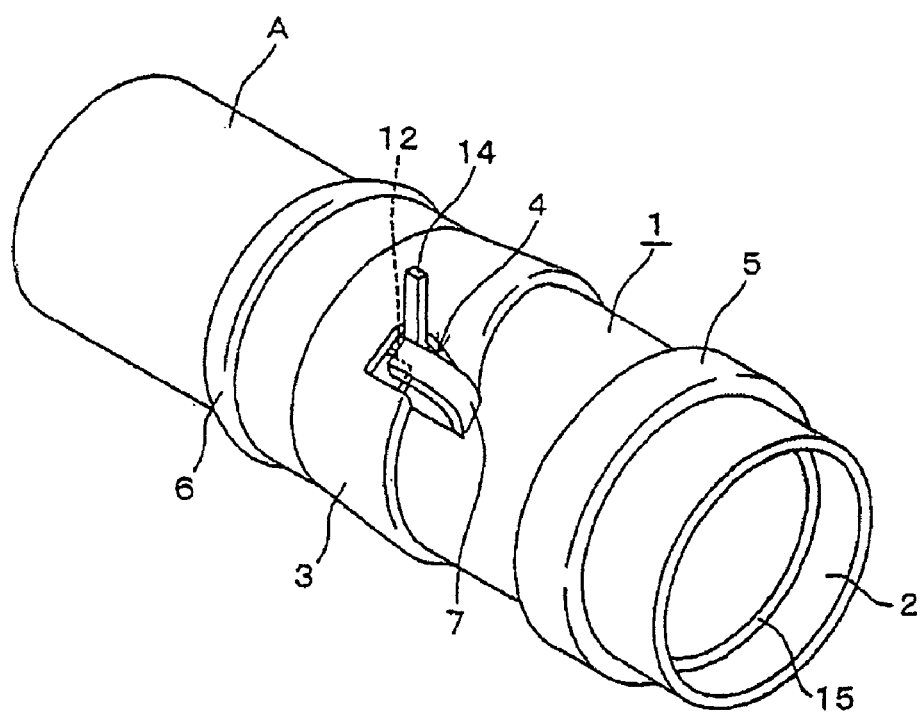
FIG. 4 is a perspective view of a state of closing a stopper member introducing port by a closing piece.
Figure 5:
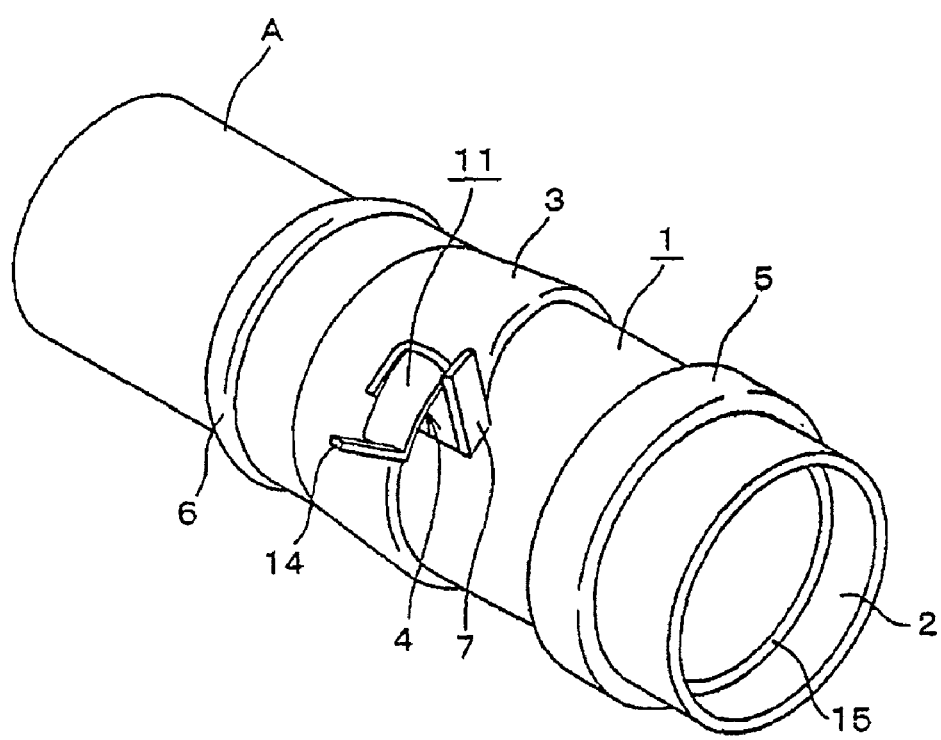
FIG. 5 is a perspective view of state of removing a stopper member from the coupling mechanism once integrated.
Figure 6:
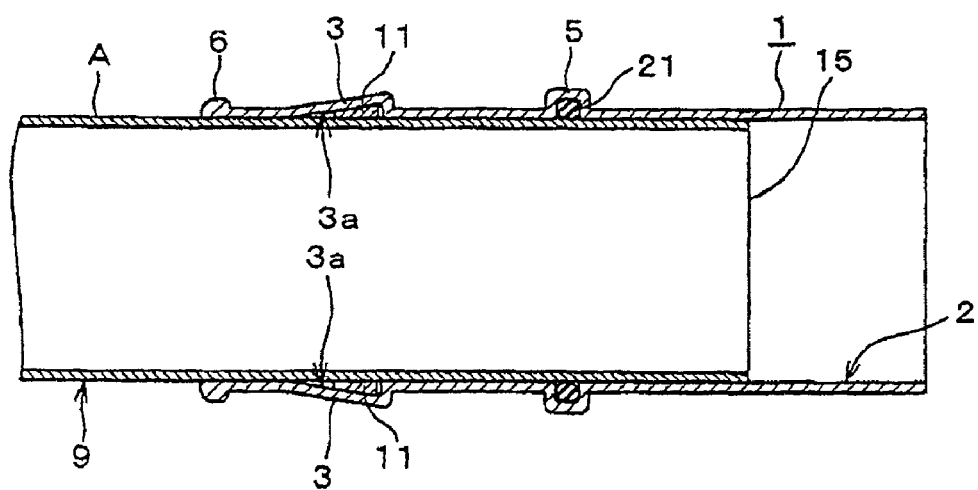
FIG. 6 is a vertical sectional view of the coupling mechanism in a state of being finished to integrate.
Figure 7:
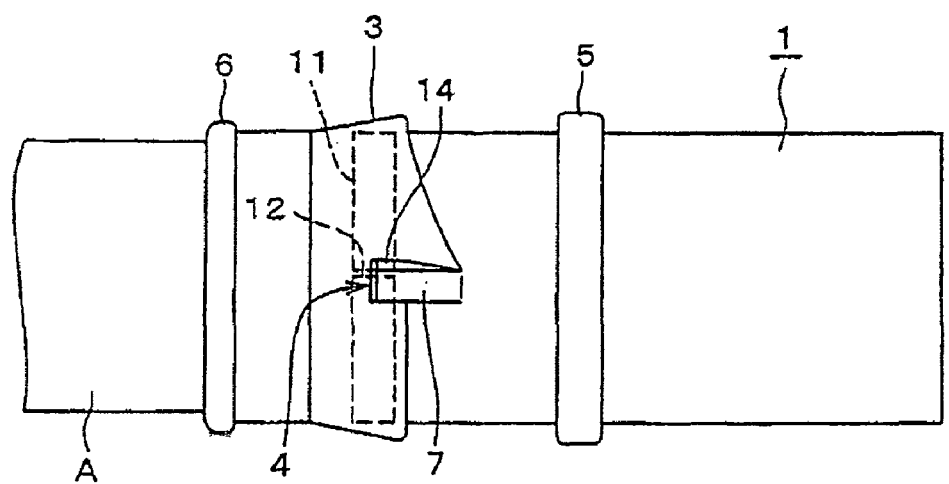
FIG. 7 is a plane view of the same.

FIG. 1 is a disassembled perspective view of a coupling mechanism according to the invention, FIG. 2 is a perspective view of a state in the midst of integrating the same, FIG. 3 is a perspective view of a state of finishing to integrate the same, FIG. 4 is a perspective view of a state of closing a stopper member introducing port by a closing piece, FIG. 5 is a perspective view of a state of removing a stopper member from the coupling mechanism once integrated, FIG. 6 is a vertical sectional view of the coupling mechanism in a state of being finished to integrate, and FIG. 7 is a plane view of the same.

Figure 8:
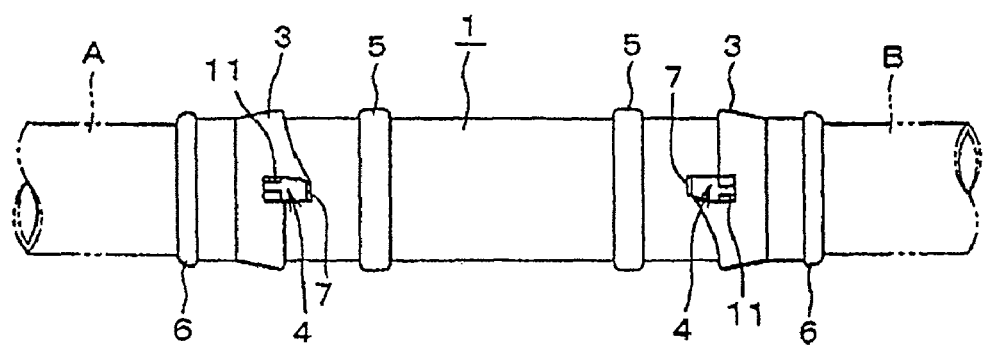
FIG. 8 is a plane view of an embodiment of a sheath pipe type.
Figure 9:
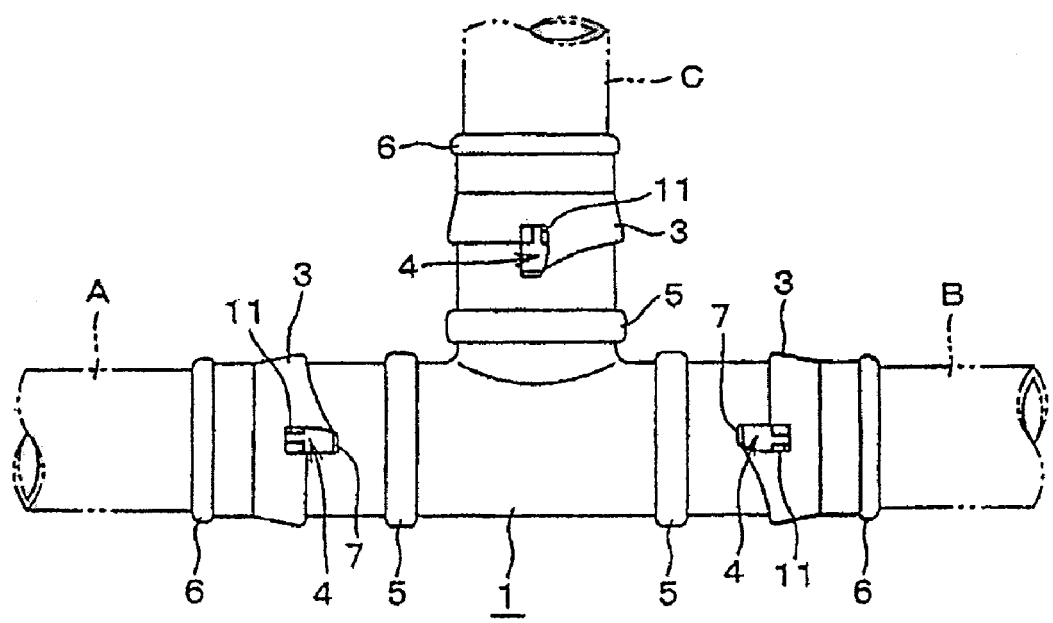
FIG. 9 is a plane view of an embodiment of a T pipe type.
Figure 10:
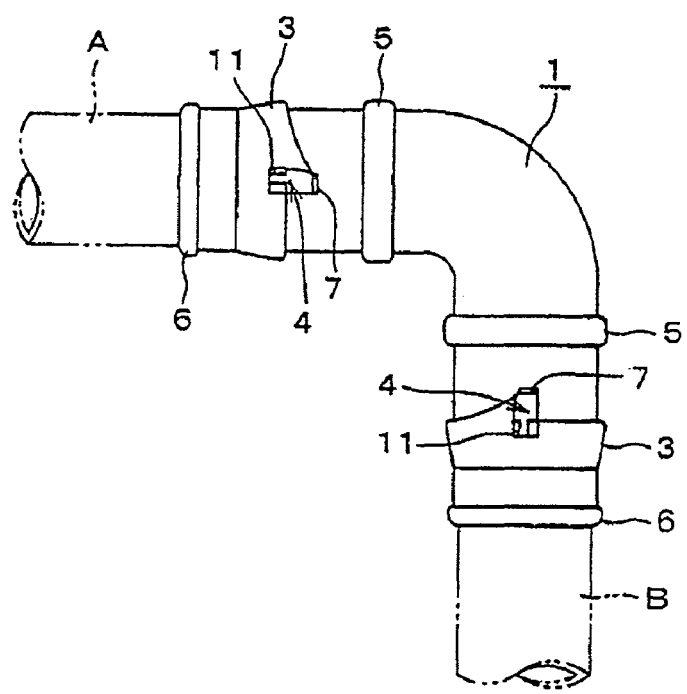
FIG. 10 is a plane view of an embodiment of an elbow pipe type.
Figure 11:
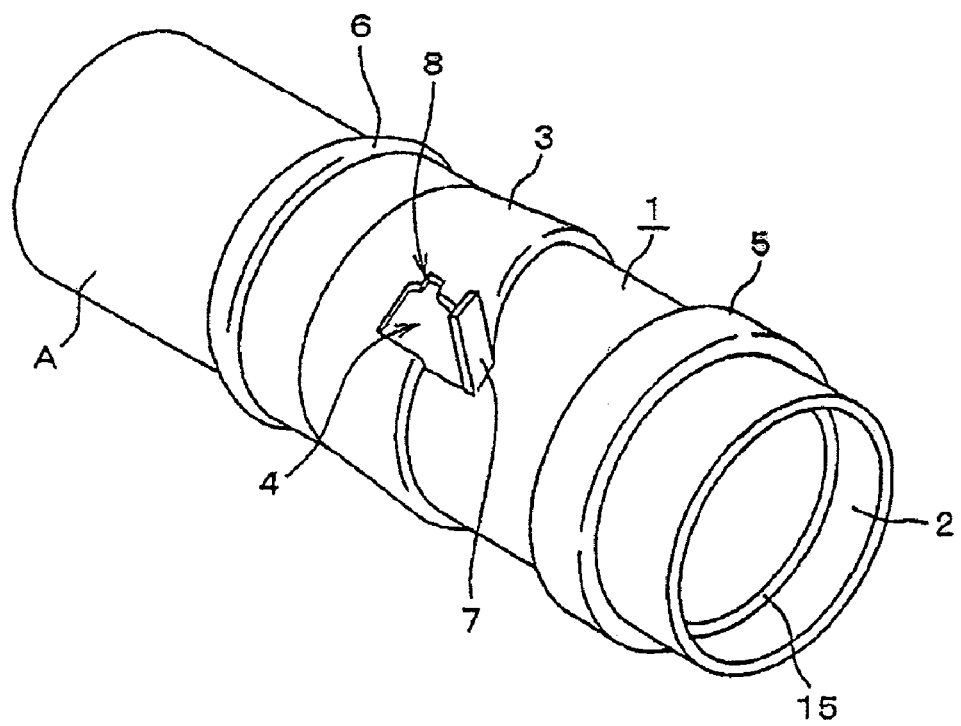
FIG. 11 is a perspective view showing a notched portion of containing a rise piece of a stopper member.
Figure 12:
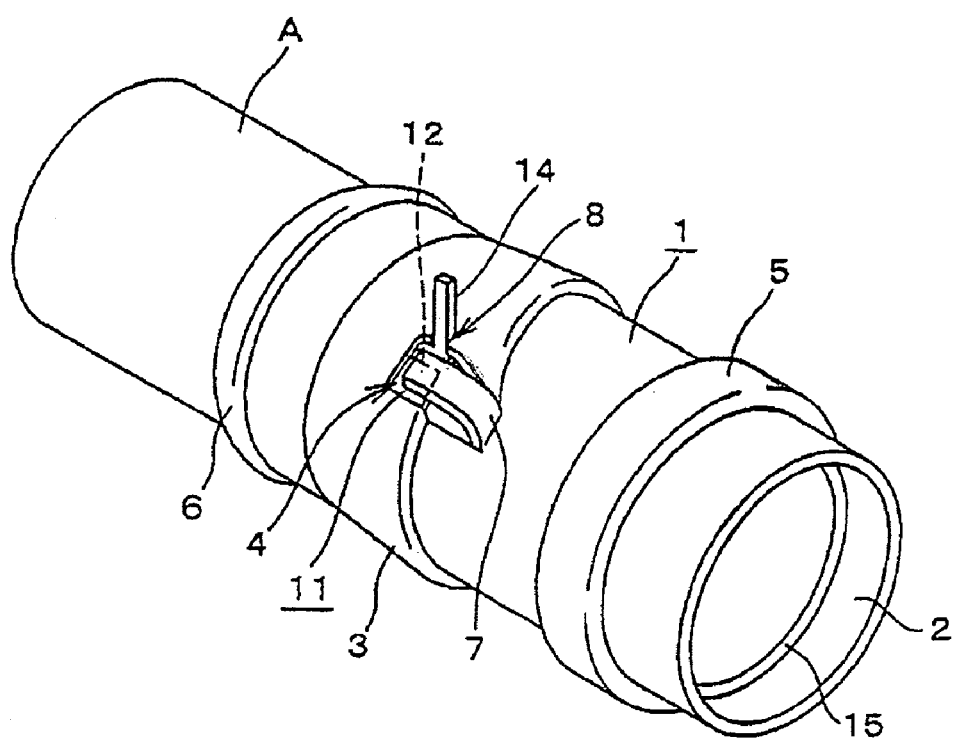
FIG. 12 is a perspective view of a state of setting the stopper member in the preceding drawing.
Figure 13:
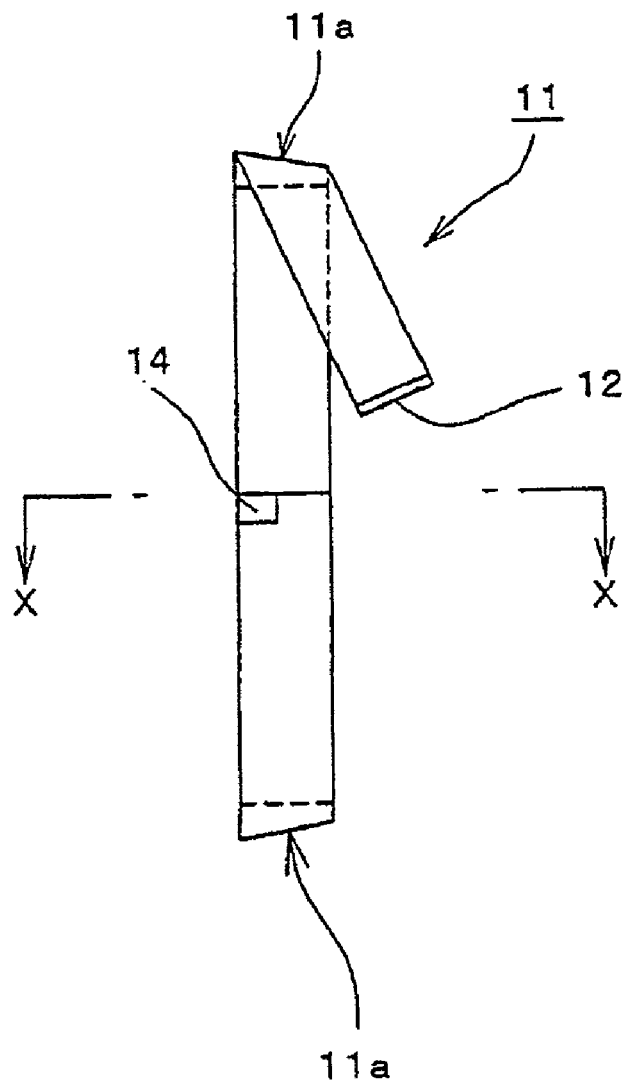
FIG. 13 is a plane view of the stopper member.
Figure 14:
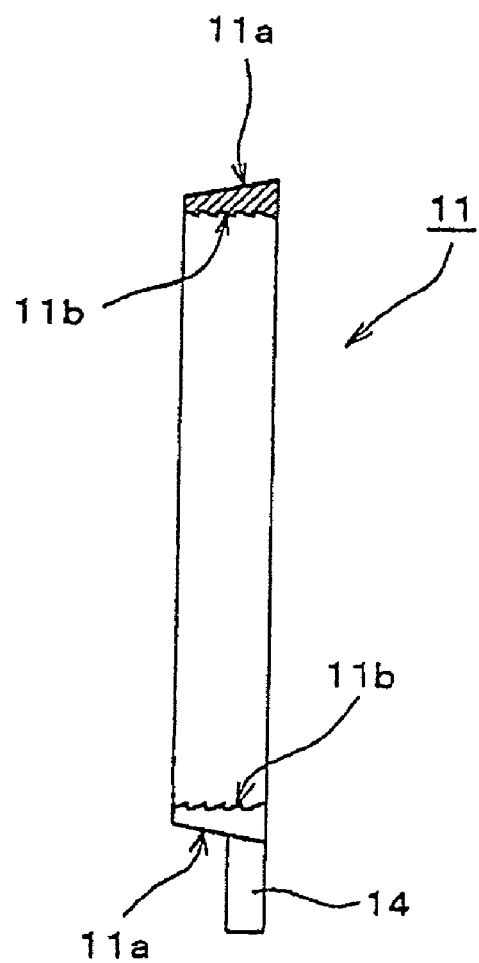
FIG. 14 is a sectional view taken along a line X-X of preceding drawing.

Further, FIG. 8 is a plane view of an embodiment of a sheath pipe type, FIG. 9 is a plane view of an embodiment of a T pipe type, FIG. 10 is a plane view of an embodiment of an elbow pipe type, FIG. 11 is a perspective view showing a notched portion of containing a rise piece of the stopper member, FIG. 12 is a perspective view of a state of setting the stopper member in the preceding drawing, FIG. 13 is a plane view of the stopper member, and FIG. 14 is a sectional view taken along a line X-X of the preceding drawing.

A coupling mechanism of the invention is constituted by a coupling main body 1, a stopper member 11, connected pipes A, B, C and an elastic ring 21 for sealing.

First, the coupling main body 1 is a cylinder member in a shape of a circular cylinder formed by a pertinent material of a metal, a synthetic resin or the like, and an inner peripheral wall 2 thereof is inscribed with an outer side ring groove 3.

The outer side ring groove 3 contains an outer peripheral side edge portion 11a of the stopper member 11. Further, at a position of a portion of a wall portion of the coupling main body 1 formed with the outer side ring groove 3, a stopper member introducing port 4 formed by a width wider than a width dimension L1 of the strip member of the stopper member 11 is inscribed.

Although the width dimension L2 of the stopper member introducing port 4 is made to be the width wider than the width dimension L1 of the strip member of the stopper member 11, when a size of the width dimension L2 is formed by about 1.5 through 2.5 times as much as the width dimension L1 of the strip member of the stopper member 11, an effect that an operation of inserting the stopper member is carried out unforcibly is achieved.

The multiplication factor is pertinently selected by sizes, materials or the like of respective members, and when a core deviation pitch L3 is formed at the stopper member 11, it is preferable that the multiplication factor is made to be equal to the core deviation pitch L3.

Further, an elastic ring groove 5 for sealing formed at the coupling main body 1 is a groove pertinently formed for ensuring a sealing performance and a setting position of the elastic ring 21 for sealing.

Further, bulged edge portions 6 formed on outer sides of respective end edges of the coupling main body 1 are formed for maintaining a strength of the coupling main body 1 and ensuring an easiness in handling in operation.

Further, although the stopper member 11 is constituted by a shape of notching a portion of a ring-like strip member of a metal or the like, as shown by FIG. 1, it is preferable to apply a spiral torsion such that both end portions 12, 13 opposed to each other of the ring-like strip member slightly bring about a core deviation (in FIG. 1, a core deviation pitch is designated by L3).

It is normal to form an outer peripheral wall of a portion of forming the outer side ring groove 3 of the coupling main body of the invention in a bulged shape (naturally, although it is also conceivable not to from the outer peripheral wall in the bulged shape depending on a thickness dimension of the coupling main body, it is general to process the outer peripheral wall in the bulged shape from a view point of achieving thin-walled formation of a total), when the front end 12 of the stopper member 11 is touched to the stopper member introducing port 4, a remaining portion of the stopper member 11 other than the front end 12 of the stopper member 11 is disposed to be in line with the outer peripheral wall of the coupling main body 1 in a state of being applied with the spiral torsion.

In order to smoothly insert the stopper member 11 into the outer side ring groove 3, an operator at the site carries out the operation while applying the spiral torsion to the stopper member 11. Here, according to the stopper member 11 of the invention, the stopper member 11 applied with the spiral torsion beforehand is used, and therefore, the spiral torsion is applied such that the both end portions 12, 13 opposed to each other of the ring-like strip member forming the stopper member carry out the core deviation slightly (in FIG. 1, the core deviation pitch is designated by notation L3).

Successively, when a rise piece 14 is formed by folding to bend an edge portion of the rear end 13 of the stopper member 11, in inserting the stopper member 11 to the stopper member introducing port 4, the operation can be carried out by grasping the rise piece, the rise piece 14 constitutes a mark of whether the stopper member 11 is accurately inserted to a predetermined position, further, achieves a stopping function in stopping the inserting operation at the predetermined position.

Naturally, there is also achieved a characteristic that when the stopper member 11 is drawn by some reason, the operation becomes easy by grasping the rise piece 14.

Further, according to the invention, a closing piece 7 of closing the stopper member introducing port 4 can be formed in the vicinity of the stopper member introducing port 4 of the coupling main body 1, when the front end 12 of the stopper member 11 is inserted from the stopper member introducing port 4, the stopper member 11 is correctly set to between the outer side ring groove 3 and an outer peripheral wall of the connected pipe A, B, or C, thereafter, the stopper member introducing port 4 is closed by making the closing piece 7 fall, the stopper member 11 is held stably at the set position and is not drawn from the coupling main body 1 (refer to FIG. 11 and FIG. 12).

Further, when a notched portion 8 capable of containing the rise piece 14 of the stopper member 11 is formed in the vicinity of an edge portion of the stopper member introducing port 4 of the coupling main body 1, the front end 12 of the stopper member is inserted from the stopper member introducing port 4, the stopper member 11 is correctly set, thereafter, the rise piece 14 of the stopper member 11 is contained in the notched portion 8, only thereby, the stopper member 11 can be contained stably at the aimed set position, and the stopper member 11 is brought into a state of not being drawn unpreparedly from the coupling main body 1 by the stable state (refer to FIG. 11 and FIG. 12).

A procedure of integrating the coupling mechanism of the invention according to the above-described constitution will be explained.

First, the elastic ring 21 for sealing of an O ring or the like is locked by the connected pipe A, B, or C in the state of FIG. 1, and an insetting front end 15 of the connected pipe A is inserted to an inner side of the coupling main body 1.

At this occasion, an inner peripheral wall 2 of the coupling main body 1 is formed with a positioning stepped portion 10 to project, and therefore, the insetting front end 15 of the connected pipe A is butted to the positioning stepped portion 10 to be stopped at a proper position. Thereby, the proper position of inserting the connected pipe A can easily be derived.

Further, when the insetting front end 15 of the connected pipe A is intended to stop at a preferred position before butting the positioning stepped portion 10 (for example, a case of intending to ensure a play dimension in consideration of an elongation margin or the like of the connected pipe), the insetting front end 15 of the connected pipe A may be butted temporarily to the positioning stepped portion 10, marking may be carried out at the position, a preferred correction marking may be carried out at a position remote from the marking position by constant dimension, thereafter, the connected pipe A may be inserted to inside of the coupling main body 1 by depending on the correction marking.

Next, as shown by FIG. 2, by way of rotating and progressing the front end 12 of the stopper member 11 from the stopper member introducing port 4, the connected pipe A is going to be inserted gradually such that the stopper member 11 is correctly set between the outer side ring groove 3 and the outer peripheral wall of the connected pipe A. The inserting operating is finished at a time point of bringing the rise piece 14 of the stopper member 11 into contact with the edge portion of the stopper member introducing port 4.

During the inserting operation, the stopper member 11 is brought into a state of being applied with the spiral torsion to carry out core deviation, and therefore, there is achieved an advantage of capable of smoothly inserting the stopper member 11 by a light force without receiving a strong resistance in inserting. Further, at a time point of finishing the inserting operation, by the outer side ring groove 3 inscribed at the inner peripheral wall 2 of the coupling main body 1, the spiral torsion formed at the stopper member 11 is restricted to recover and the stopper member 11 shows a shape of a ring substantially without core deviation.

Under such a state, the outer peripheral side edge portion 11a of the stopper member 11 is contained at inside of the outer side ring groove 3, and therefore, when a drawing force in a drawing direction is applied to the connected pipe A, the connected pipe A is prevented from being drawn by an operation of the stopper member 11.

That is, according to the stopper member 11 of the invention, as shown by FIG. 13 and FIG. 14, a cross-sectional face thereof is formed in a shape of a wedge, an inner peripheral wall 3a of the outer side ring groove 3 is formed by a taper face in a state of being expanded from a rear end side to a front end side in an inserting direction, also the outer peripheral wall 11a of the stopper member 11 is formed by a taper face in a shape in correspondence with the taper face of the outer side ring groove, and therefore, by a wedge effect of the stopper member, an operation of gradually increasing a fastening force in proportion to a drawing force applied to the connected pipe A is achieved, and therefore, a firm brake force can be applied.

Further, an inner peripheral wall 11b of the stopper member 11 is formed by a shape substantially in parallel with an outer peripheral wall 9 of the connected pipe A, a face of the inner peripheral wall 11b of the stopper member 11 is formed by a rough face achieving a slip preventing effect, and therefore, contact faces of the connected pipe and the stopper member maintain a positional relationship of being arranged in parallel with each other in a state of being brought into face contact with each other.

Although the rough face formed at the face of the inner peripheral wall 11b of the stopper member 11 is not particularly restricted so far as the rough face is a rough face having a rough feeling and achieving the slip preventing effect, when formed in a shape of a saw teeth showing a shape of applying a resistance in a drawing direction, a firmer brake force is achieved against the force of drawing the connected pipe A.

Further, although according to the stopper member 11 of the invention, a portion of the ring-like strip member is notched, all of portions of the ring-like strip member other than the notched portion is constituted by a continuous shape, and therefore, a pressing force (fastening force) conducted from the inner peripheral wall 3a of the outer side ring groove 3 is conducted from the face of the inner peripheral wall 11b of the stopper member 11 to the connected pipe A in a state of fastening in a face-like state (achieving a continuous fastening effect as in a wallet string of a wallet bag), and therefore, the firmer brake force is achieved against the force of drawing the connected pipe A.

The constitution of the stopper member 11 of the invention in this way achieves a characteristic that the constitution can sufficiently deal with not only a case in which the connected pipe A is thick-walled but also a case in which the connected pipe A is thin-walled.

Further, in a case of drawing the stopper member 11 from the coupling main body 1 by some reason, the case can be dealt with by carrying out an operation in an order reverse to that of the inserting operation. Such an operation is made to be able to carry out, and therefore, when the connected pipe A, B, or C is interchanged, or piping is reexecuted, there is brought about a characteristic of capable of repeating the operation by any number of times.

Further, the stopper member 11 contained at the stable position once also achieves a characteristic that it can be confirmed that an execution of the coupling mechanism without fail is carried out by only checking to optically recognize the state from outside, and even when there is a case of carrying out a rough operation at the site accidentally, the safety can simply be checked.

According to the coupling mechanism of the invention, in view from a side of the connected pipe, the coupling mechanism is positioned such that the elastic ring 21 for sealing is arranged at a position proximate to the insetting front end 15, and the stopper member 11 is arranged on a side of being remote from the insetting front end 15, and therefore, there is constituted an arrangement in which a problem of a liquid leakage or the like of a fluid flowing at inside of the connected pipe A can safely be dealt with by presence of the elastic ring 21 for sealing. That is, a problem may not be posed at all with regard to the sealing performance against the liquid leakage by the constitution at the vicinity of the integrated portion of the stopper member 11.

The coupling mechanism of the invention is applicable also to piping of a sheath pipe type (refer to FIG. 8), to piping of a T like type (refer to FIG. 9) and piping of an elbow pipe type (refer to FIG. 10), further, to any type in correspondence therewith.

According to the coupling mechanism of the invention, in comparison with a mechanism of the same kind of the background art, caulking, screw fastening or the like is not needed, and therefore, the execution is easily performed without using a special work tool, resulting in excellent operability.

The coupling mechanism according to the invention can be utilized in a field of various piping construction of supply and drain pipes, intake and exhaust pipes, a protecting pipe of power/communication cable or the like.

Further, according to the coupling mechanism of the first aspect of the invention, the connected pipe attached with the elastic ring for sealing is inserted to the opening portion of the coupling main body, the outer side ring groove inscribed at the inner peripheral wall of the coupling main body and the inner side ring groove inscribed at the outer peripheral wall of the connected pipe are set in a state of being opposed to each other, under the state, the stopper member is touched to be in line with the outer peripheral wall of the coupling main body, successively, the front end of the stopper member is inserted to rotate from the stopper member introducing port, thereby, the stopper member can simply be set to a position of being contained in the outer side ring groove, the rough face of the face of the inner peripheral wall of the stopper member is brought into press contact with the face of the outer peripheral wall of the connected pipe, and therefore, a state of not drawing the connected pipe from the coupling main body is finished.

At this occasion, the elastic ring for sealing is provided at the outer peripheral wall of the connected pipe disposed on a side in a direction of the inserting the front end of the connected pipe more than the stopper member set position, and therefore, a sealing performance of the connected pipe and the coupling main body is not deteriorated at all. Further, pivoting of the connected pipe is quite free, and an elongating and contracting movement of the connected pipe can freely be adjusted within a range of a width dimension of the inner side ring groove.

Further, the stopper member is formed substantially in the ring-like shape, and therefore, when the stopper member is not applied with the spiral torsion, in inserting the front end of the stopper member to the stopper member introducing port, by a condition of a size and a shape of the stopper member introducing port, the stopper member needs to be inserted while applying the spiral torsion, however, here, although when the stopper member is formed by the strip member having a high flexibility, the spiral torsion can comparatively easily be applied to the stopper member by a light force, it is generally difficult or troublesome that an operator works the spiral torsion at the site of execution. Therefore, according to the invention, the spiral torsion is applied beforehand such that the both end portions opposed to each other of the strip member carry out slightly the core deviation, thereby, the operation of insetting the stopper member is made to be carried out easily.

According to the coupling mechanism of the second aspect of the invention, the rough face of the inner peripheral wall face of the stopper member is constituted by the saw teeth shape, and therefore, as described above, a sectional shape of the stopper member shows a wedge shape, when the connected pipe is applied with a force in the drawing direction, the saw teeth of the inner peripheral wall face in the sectional shape of the wedge shape is resulted to bite the outer peripheral wall face of the connected pipe in proportion to a drawing force with regard to the outer peripheral wall face of the connected pipe, and therefore, a stronger effect of preventing the connected pipe from being drawn is achieved.

According to the coupling mechanism of the third aspect of the invention, when the closing piece of the coupling main body is made to fall sideways to close the stopper member introducing port, there is achieved an effect in which the stopper member set between the inner peripheral wall of the outer side ring groove and the outer peripheral wall of the connected pipe cannot be drawn from the stopper member introducing port.

According to the coupling mechanism of the fourth aspect of the invention, by forming the rise piece at the edge portion of the rear end of the stopper member, handling in the operation of inserting the stopper member is facilitated, and an operability of integrating the coupling mechanism is further promoted.

According to the coupling mechanism of the fifth aspect of the invention, the notched portion is formed in the vicinity of the edge portion of the stopper member introducing port, and therefore, by containing the rise piece to the notched portion at a stage of finishing to set the stopper member, a stability of the position of setting the stopper member is further ensured.

According to the coupling mechanism of the sixth aspect of the invention, the positioning stepped portion capable of being brought into contact with the inserting front end of the connected pipe is formed at the inner peripheral wall face of the coupling main body, and therefore, by only inserting the connected pipe to inside of the coupling main body and bringing the inserting front end of the connected pipe into contact with the positioning stepped portion, there is achieved an effect of automatically determining a preferred position of inserting the connected pipe to inside of the coupling main body and capable of pertinently and effectively carrying out the operation of inserting the stopper member.

What is claimed is:
1. A coupling mechanism, comprising:
a coupling main body in a shape of a circular cylinder;
a stopper member in
a shape of notching a portion of a ring-like strip member;
a connected pipe inserted to an inner side of the coupling main body; and an elastic ring for sealing attached to an outer periphery in the vicinity of an inserting front end of the connected pipe, wherein an inner peripheral wall of the coupling main body is inscribed with an outer side ring groove containing an outer peripheral side edge portion of the stopper member, and a stopper member introducing port formed by a width wider than a width dimension of the strip member of the stopper member is inscribed at a position of an outer wall portion of the coupling main body shifted from a position of inscribing the outer side ring groove slightly on a side of an inserting front end, wherein the stopper member is brought into a state of being applied with a spiral torsion such that both end portions opposed to each other of the strip member of the stopper member carry out a core deviation slightly, wherein an inner peripheral wall of the outer side ring groove is formed by a taper face in a state of being expanded from a rear end side to a front end side in an inserting direction, and also an outer peripheral wall of the stopper member is formed in a taper face of a shape in correspondence with the taper face of the outer side ring groove, and wherein the inner peripheral wall of the stopper member is formed in a state of being substantially in parallel with the outer peripheral wall of the connected pipe and a face of the inner peripheral wall is formed by a rough face achieving a slip preventing effect.

2. The coupling mechanism according to claim 1, wherein the rough face of the face of the inner peripheral wall of the stopper member is of a saw teeth shape.

3. The coupling mechanism according to claim 1, wherein a closing piece of closing the stopper member introducing port is formed at a portion of the coupling main body.

4. The coupling mechanism according to claim 1, wherein a rise piece is formed at an edge portion of a rear end of the stopper member.

5. The coupling mechanism according to claim 1, wherein a notched portion capable of containing the rise piece of the stopper member is formed in the vicinity of an edge portion of the stopper member introducing port.

6. The coupling mechanism according to any claim 1, wherein a positioning stepped portion capable of being brought into contact with the inserting front end of the connected pipe is formed at a face of an inner peripheral wall of the coupling main body.

* * * * *